United States Patent
Smidt et al.

(10) Patent No.: US 9,435,568 B2
(45) Date of Patent: Sep. 6, 2016

(54) DEVICE AND METHOD FOR FIXING OBJECTS, IN PARTICULAR SOLAR PANELS, TO A ROOF

(75) Inventors: Theo Jacob Smidt, PB Kring Van Dorth (NL); Jeroen de Vogel, GS Deventer (NL)

(73) Assignee: ESDEC B.V., Deventer (NL)

( * ) Notice: Subject to any disclaimer, the term of this patent is extended or adjusted under 35 U.S.C. 154(b) by 603 days.

(21) Appl. No.: 11/816,963

(22) PCT Filed: Feb. 22, 2006

(86) PCT No.: PCT/NL2006/050031
§ 371 (c)(1),
(2), (4) Date: Sep. 30, 2008

(87) PCT Pub. No.: WO2006/101392
PCT Pub. Date: Sep. 28, 2006

(65) Prior Publication Data
US 2009/0025313 A1    Jan. 29, 2009

(30) Foreign Application Priority Data
Feb. 23, 2005    (NL) .................................... 1028379

(51) Int. Cl.
| F24J 2/46 | (2006.01) |
| F24J 2/52 | (2006.01) |
| H02S 20/23 | (2014.01) |

(52) U.S. Cl.
CPC ............ *F24J 2/5247* (2013.01); *F24J 2/5205* (2013.01); *H02S 20/23* (2014.12); *F24J 2002/4661* (2013.01); *F24J 2002/4665* (2013.01); *Y02B 10/12* (2013.01); *Y02B 10/20* (2013.01); *Y02E 10/47* (2013.01)

(58) Field of Classification Search
CPC ............. F24J 2/5247; F24J 2002/4661; F24J 2002/4665; H02S 20/23; Y02E 10/47; Y02B 10/12
USPC ................................. 52/173.3; 136/244, 251
See application file for complete search history.

(56) References Cited

U.S. PATENT DOCUMENTS

| 4,775,570 | A  | * | 10/1988 | Ohlenforst et al. | ............ 428/83 |
| 6,370,828 | B1 | * | 4/2002  | Genschorek | .................... 52/200 |
| 6,405,494 | B1 | * | 6/2002  | Wismeth | ...................... 52/173.3 |
| 6,465,724 | B1 | * | 10/2002 | Garvison et al. | ............. 136/244 |

(Continued)

FOREIGN PATENT DOCUMENTS

| DE | 19717996 A1 | 10/1998 |
| DE | 29817311 U1 | 12/1998 |

(Continued)

OTHER PUBLICATIONS

Search Report for Netherlands Patent Application No. 1028379; Sep. 19, 2005.

(Continued)

*Primary Examiner* — Andrew J Triggs
(74) *Attorney, Agent, or Firm* — Maier & Maier, PLLC

(57) ABSTRACT

A device for fixing objects, in particular solar panels, to a roof, the device comprising at least one base element connectable to the roof and a top structure connectable to the base element for fixing to an object, wherein the base element and the top structure can be mutually coupled by means of a snap connection. A process for assembling such devices.

22 Claims, 3 Drawing Sheets

(56) References Cited

U.S. PATENT DOCUMENTS

| | | | |
|---|---|---|---|
| 6,959,517 B2* | 11/2005 | Poddany et al. | 52/173.3 |
| 8,109,048 B2* | 2/2012 | West et al. | 52/173.3 |
| 2004/0154655 A1* | 8/2004 | Tanaka | 136/244 |
| 2004/0187909 A1* | 9/2004 | Sato et al. | 136/251 |
| 2004/0221524 A1* | 11/2004 | Poddany et al. | 52/204.5 |
| 2009/0025313 A1* | 1/2009 | Smidt et al. | 52/173.3 |
| 2009/0044850 A1* | 2/2009 | Kimberley | 136/244 |

FOREIGN PATENT DOCUMENTS

| | | | |
|---|---|---|---|
| DE | 19811399 A1 * | 9/1999 | E04D 13/18 |
| DE | 29912699 U1 | 1/2000 | |
| DE | 10132557 A1 | 6/2002 | |
| DE | 101322557 A1 | 6/2002 | |
| DE | 20307139 U1 | 7/2003 | |
| DE | 10344202 A1 | 4/2004 | |
| DE | 202004008499 U1 | 10/2004 | |
| EP | 1348915 A2 | 10/2003 | |
| FR | 2540921 | 8/1984 | |
| WO | 9917063 A1 | 4/1999 | |

OTHER PUBLICATIONS

Search Report for International Patent Application No. PCT/NL2006/050031; Dec. 29, 2006.

Examination Report dated Dec. 21, 2015, 5 pages, from European Patent Application No. 06/716,665.

* cited by examiner

DEVICE AND METHOD FOR FIXING OBJECTS, IN PARTICULAR SOLAR PANELS, TO A ROOF

PRIORITY CLAIM

This patent application is a U.S. National Phase of International Patent Application No. PCT/NL2006/050031, filed Feb. 22, 2006, which claims priority to Netherlands Patent Application No. 1028379, filed Feb. 23, 2005, the disclosures of which are incorporated herein by reference in their entirety.

FIELD

The present disclosure relates to a device for fixing objects, in particular solar panels, to a roof. The present disclosure also relates to an assembly of such devices, and further relates to a method for fixing objects, in particular solar panels, to a roof.

BACKGROUND

Solar panels and solar boilers are increasingly being arranged commercially on roofs, which may or may not be pitched, in order to be able to employ solar energy in a relatively simple and advantageous manner for generating electricity or for heating a medium. Such objects are fixed to a roof by means of a fixing device or supporting device. The known fixing device herein comprises a plurality of profiles which are fixed by means of screws to one or more tile battens, and a mounting rail which is fixed to the profiles by means of, usually specifically designed, mechanical fixing elements, such as, for instance, bolts, nuts and the like. The actual object can be arranged on the mounting rail. The known fixing device does, however, have a number of drawbacks. A significant drawback of the known device is that the mounting of an object on the roof is a relatively time-consuming activity because of the relatively high number of mechanical fixing elements required. Special tools are often required, such as, for instance, a right-angle screwing machine, for mounting the device correctly. In addition, mounting of the device can usually only be carried out by specialist professionals, which generally makes mounting of the object relatively expensive.

SUMMARY

The present disclosure describes several exemplary embodiments of the present invention.

One aspect of the present disclosure provides a device for fixing objects, in particular, solar panels, to a roof, the device comprising a) at least one base element connectable to the roof and b) a top structure connectable to the base element for fixing to an object, wherein the base element and the top structure can be mutually coupled by means of a snap connection.

Another aspect of the present disclosure provides a system for fixing objects, in particular, solar panels, to a roof comprising a plurality of devices, each comprising a) at least one base element connectable to the roof and b) a top structure connectable to the base element for fixing to an object, wherein the base element and the top structure can be mutually coupled by means of a snap connection, and wherein the assembly is adapted to support at least one object, in particular, a solar panel.

A further aspect of the present disclosure provides a method for fixing objects, in particular, solar panels, to a roof, the method comprising a) fixing at least one base element to a roof, in particular, to a tile batten arranged on the roof, b) fixing a top structure to the base element by means of a snap connection, and c) fixing at least one object to the top structure.

By mutually coupling the base element and the top structure by means of a snap connection, often referred to as a click connection, the number of components required for mounting the device according to the present disclosure can be significantly reduced, which considerably facilitates and, in particular, simplifies and speeds up mounting. Furthermore, specialist professionals are not required for coupling the base element and the top structure. Nor are specific tools necessary to enable the snap coupling. Tests have shown that with the relatively rapid and simplified mounting of the device according to the present disclosure a cost-saving of about 40% can be achieved compared to the average cost of mounting a conventional device known in the prior art; and the time required for mounting the device according to the present disclosure is generally reduced by about 60% compared to the time required for mounting the conventional device. This reduced mounting time, and therefore working time, is generally also advantageous from a working safety viewpoint, since a fitter need only be on usually dangerous pitched roofs for a relatively short period of time. The device will generally be applied for mounting solar panels on a tiled roof. It is, however, also possible to envisage arranging other objects, such as, for instance, a solar boiler, on the roof by means of the device according to the present disclosure. In addition to fixing such objects to a roof, it is also possible to envisage fixing such objects by means of a device according to the present disclosure to, for instance, an (outside) wall of a property. In order to realize the snap connection, the base element preferably comprises coupling means for co-action with mating means forming part of the top structure. Both the coupling means and the mating means can be of very diverse design. The coupling means and the mating means are, however, preferably adapted to mutually realize a relatively strong, stable and reliable snap connection, so as to be able to prevent, or at least counter, undesired uncoupling of the object relative to the roof.

In an exemplary embodiment of the device according to the present disclosure, the base element and the top structure are adapted for mutually releasable coupling. It is then possible to disassemble an already mounted device in a relatively simple manner. A releasable coupling facilitates maintenance and/or replacement operations on parts of the device. The snap connection is preferably adapted for two-dimensional fixation of the relative orientation of the base element and the top structure. One dimension is not fixed and, therefore, left free, whereby the relative orientation between the base element and the top structure can be changed in one-dimensional (linear) manner, wherein the base element is, for instance, linearly slidable along the top structure and vice versa. Such a fixation is usually advantageous since alignment of the base element relative to the roof can be realized relatively simply in this manner.

In another exemplary embodiment, the base element is provided with a substantially hook-shaped member adapted for co-action with a part of the roof, in particular, with a tile batten arranged on the roof. In this manner, at least a part of the base element can be enclosed relatively efficiently between tiles on a tiled roof without additional mechanical fixing means being necessary. A strong and reliable coupling can be realized between the roof and the base element merely by hooking the base element, or at least the hook-shaped member thereof, behind a tile batten or any other suitable element forming part of the roof. This exemplary embodiment of the base element can not only be mounted relatively quickly and simply, but also has the advantage that the tile batten is not damaged, whereby the tile batten is not unnecessarily weakened. In conventional systems, the base element is fixed to the tile batten by means of mechanical fixing elements, such as screws, often resulting in splitting or cracking of the tile batten, whereby the tile batten and, therefore, the mutual coupling between the base element and the tile batten may be considerably weakened. In a particular preferred exemplary embodiment, the hook-shaped member is provided with at least one at least partially profiled side. The friction between the roof and the base element can be increased by the profiled side, which generally increases the strength of the coupling between the roof and the base element. The profile is preferably formed by a sawtooth profile adapted for relatively intensive co-action with a part of the roof, in particular, a tile batten. Since the dimensioning and, in particular, the thickness of the tile battens is not standardized, a wide range of tile battens is available on the market. In order to allow the base element, in particular, the hook-shaped member, to coact in relatively reliable manner with the tile batten irrespective of the thickness of the tile batten, the volume of a receiving space enclosed by the substantially hook-shaped member can preferably be changed. In this way, the hook-shaped member acquires a certain adaptive capacity, wherein the effective dimensioning of the hook-shaped member can be geared to the tile batten in question.

The top structure can be very diverse in nature, but is preferably formed by a mounting rail to which the object, in particular, the solar panel, can be fixed. The advantage of a mounting rail is that the relative orientation between the mounting rail and the object can be changed, in general linearly, to allow the object to be positioned and aligned in an ideal manner. The device preferably comprises a plurality of base elements, which base elements are adapted for simultaneous co-action with the top structure. The mutual distance of the base elements can vary, but is, for instance, about one meter.

In a further exemplary embodiment, the base element is formed by an extrusion profile. The extrusion profile will usually be formed first, whereafter the extrusion profile is divided, for instance, by means of sawing, into a plurality of parts forming a corresponding number of base elements. Forming the base element from an extrusion profile (or at least a part thereof) has the important advantage that, in this way, a relatively strong base element can be provided compared to base elements manufactured by means of casting, injection moulding and folding, which increases the strength of the device.

The present disclosure also relates to an assembly of a plurality of devices according to the present disclosure. The relative orientation of the components of the assembly can be very diverse in nature. However, the top structures of the devices preferably have a substantially parallel orientation relative to each other. The distance between the top structures can vary, although the mutual distance between the top structures is preferably such that about four base elements can be arranged per square meter, in order to be able to achieve a stable and durable support of an object, in particular, a solar panel, of average size.

The present disclosure further relates to a method for fixing objects, in particular, solar panels, to a roof, preferably by means of the device according to the present disclosure, comprising, in one exemplary embodiment, the steps of: a) fixing at least one base element to a roof, in particular to a tile batten arranged on the roof, b) fixing a top structure to the base element by means of a snap connection, and c) fixing at least one object to the top structure. Because, due to forming of the snap connection, additional mechanical fixing elements are not required for mounting the device, and thereby the object, on the roof, the object can be arranged relatively quickly and efficiently on the roof. During step A) a plurality of base elements will usually be arranged, and during step B) a plurality of top structures will be coupled to the base elements, in order to allow a reliable support structure to be generated for the object or the plurality of objects. Further advantages and preferred embodiments of the method according to the invention have already been described comprehensively in the foregoing.

BRIEF DESCRIPTION OF THE DRAWINGS

The invention will be elucidated with reference to non-limitative exemplary embodiments shown in the following figures.

DETAILED DESCRIPTION

Figure 1A:
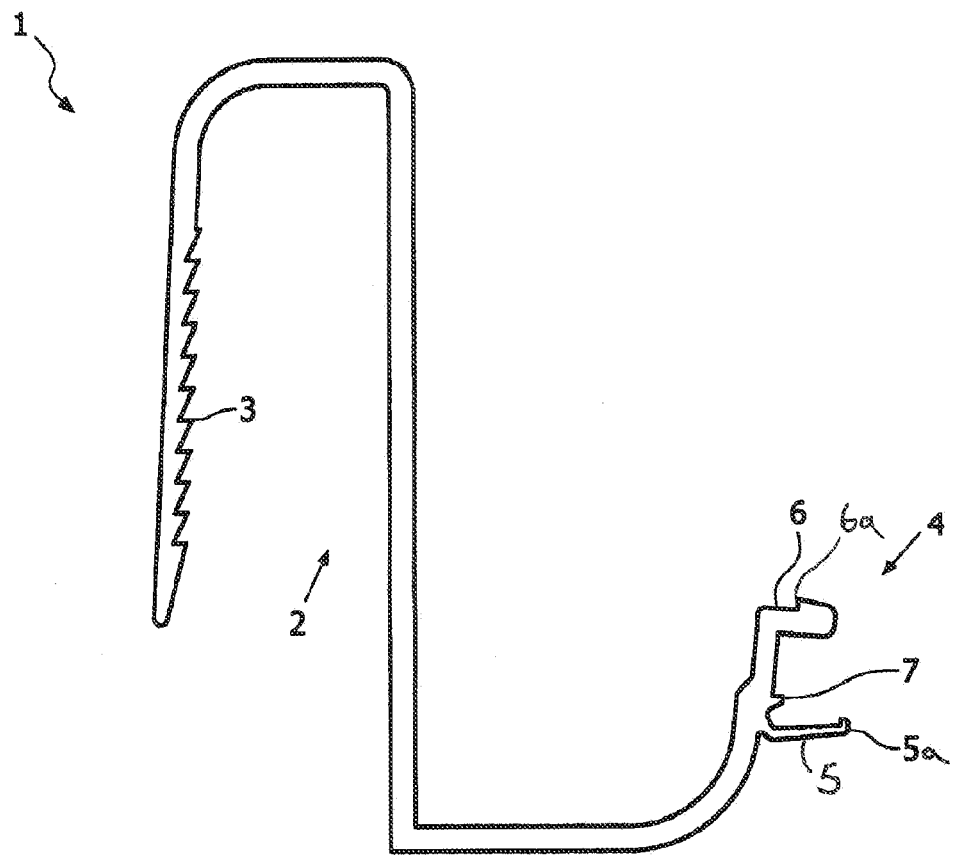
FIG. 1a is a side view of a roof hook of a device according to one exemplary embodiment of the present disclosure.

FIG. 1a shows a side view of one exemplary embodiment of a roof hook 1 of a device according to the present disclosure. Roof hook 1 is adapted particularly for coupling to a tile batten of a roof (not shown), wherein roof hook 1 serves as the base structure for a mounting rail (see FIG. 1b) to which a solar panel or other object can be fixed. Roof hook 1 comprises, for this purpose, a hook-shaped member 2 provided with a profiled inner side 3, wherein hook-shaped member 2 is adapted for co-action with a tile batten (not shown). An outer end of roof hook 1 remote from hook-shaped member 2 is provided with coupling means 4 adapted for co-action with mating means forming part of a mounting rail (see FIG. 1b). Coupling means 4 comprise one slightly resilient tongue 5 to enable a snap connection with the mating means to be realized. Coupling means 5 further comprise a protruding coupling finger 6, and an intermediate locking element 7 for realizing the coupling. Roof hook 1 is manufactured in this exemplary embodiment from an extrusion profile made of aluminium which is particularly characterized by a relatively great strength.

Figure 1B:
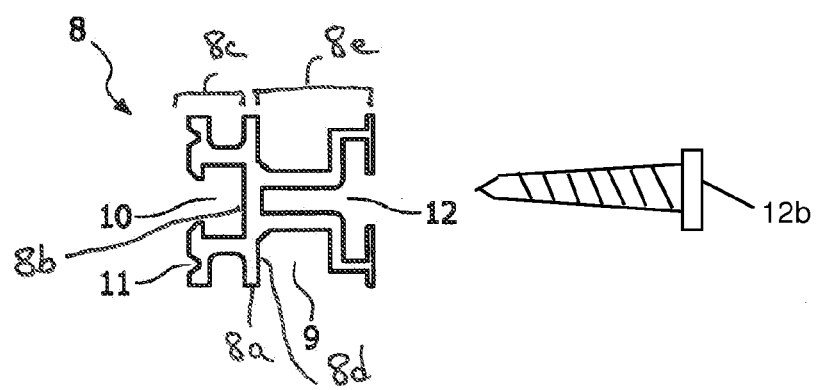
FIG. 1b is a side view of a mounting rail of a device.

FIG. 1b shows a side view of a mounting rail 8 of a device according to one exemplary embodiment of the present disclosure. Mounting rail 8 is adapted to be partially enclosed by the resilient tongue 5, wherein a tooth 5a disposed at a distal part of tongue 5 can be received in a first receiving space 9 arranged in mounting rail 8. Mounting rail 8 has a wall 8a that has a wall first side 8b that forms a hook attachment section 8c and a wall second side 8d that forms a panel attachment section 8e and is also provided with a generally C-shaped second receiving space 10 for accommodating at least a part of the protruding coupling finger 6 including a notch 6a. Mounting rail 8 is further provided with a third receiving space 11 formed by a groove for the purpose of receiving at least a part of locking element 7. A side of mounting rail 8 remote from the second receiving space 10 and third receiving space 11 is provided with a fourth receiving space 12 for receiving a part of the object, or, in any case, at least a part of mechanical fixing means connected to the object, such as, for instance, optionally by self-tapping screws 12b. By first arranging coupling finger 6 in the second receiving space 10, and subsequently pivoting the slightly resilient tongue 5 in the direction of mounting rail 8, a reliable snap connection can be realized between the two components 1, 8. The snap connection can further be broken either by slightly deforming the tongue 5, which will generally be difficult, or by moving or sliding mounting rail 8 in an axial direction relative to the roof hook 1. The length of mounting rail 8 will generally be greater than 1 meter, wherein mounting rail 8 will, in general, be manufactured from an extrusion profile made of aluminum.

Figure 2:
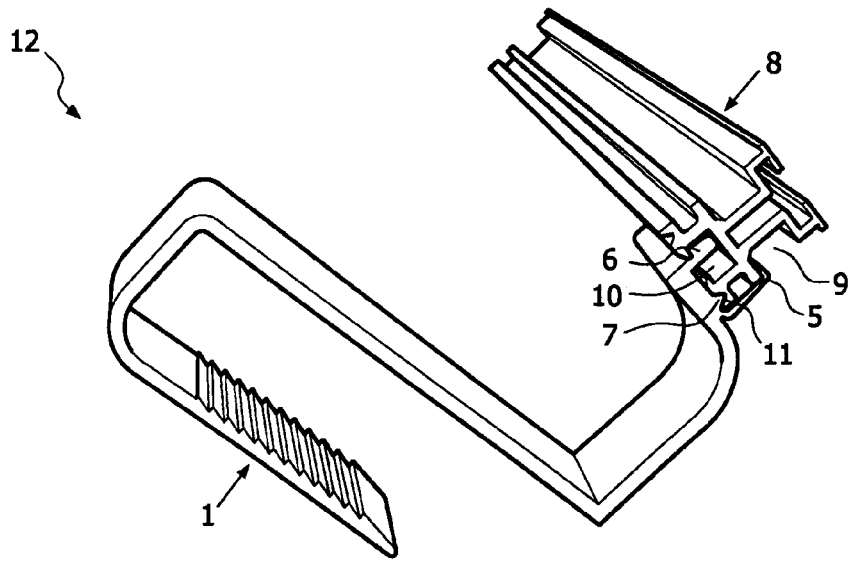
FIG. 2 is a perspective view of the roof hook of FIG. 1a and the mounting rail of FIG. 1b co-acting with the roof hook.

FIG. 2 shows a perspective view of the roof hook 1 of FIG. 1a and the mounting rail 8 of FIG. 1b co-acting with the roof hook 1. Clearly shown in FIG. 2 is that coupling finger 6 is received in the second receiving space 10 of mounting rail 8, and that locking element 7 is received in the third receiving space 11 of mounting rail 8. Tongue 5 encloses a part of the underside of mounting rail 8, wherein an outer end of tongue 5 is received in a first receiving space 9 of mounting rail 8, whereby roof hook 1 and mounting rail 8 are fixed two-dimensionally relative to each other. The assembly or support frame of roof hook 1 and the mounting rail 8 coupled to roof hook 1 forms an exemplary embodiment of a device 12 according to the present disclosure.

Figure 3:
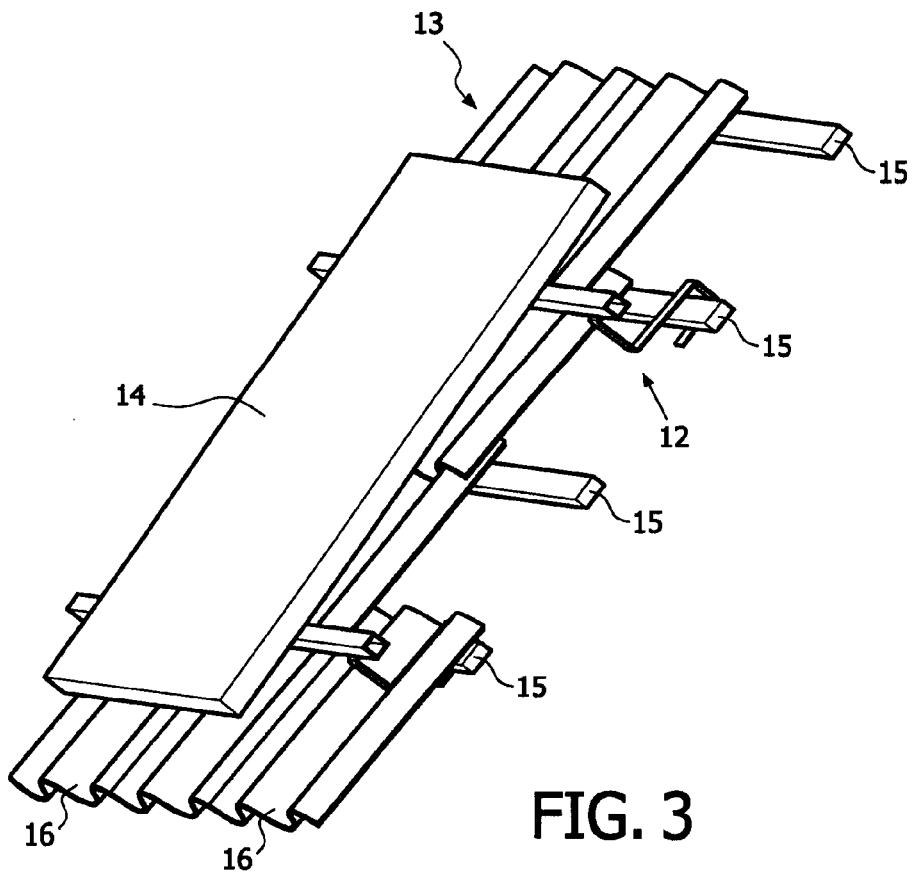
FIG. 3 is a perspective view of a solar panel arranged on a tiled roof by means of the device of FIG. 2.

FIG. 3 shows a perspective view of a solar panel 14 arranged on a tiled roof 13 by means of the device 12 of FIG. 2. The tiled roof 13 is provided with a plurality of tile battens 15 to support a plurality of roof tiles 16. Since no additional mechanical fixing elements are required for mounting the complete device 12 on tiled roof 13, disassembly can be relatively quick and at relatively low cost.

Figure 4:
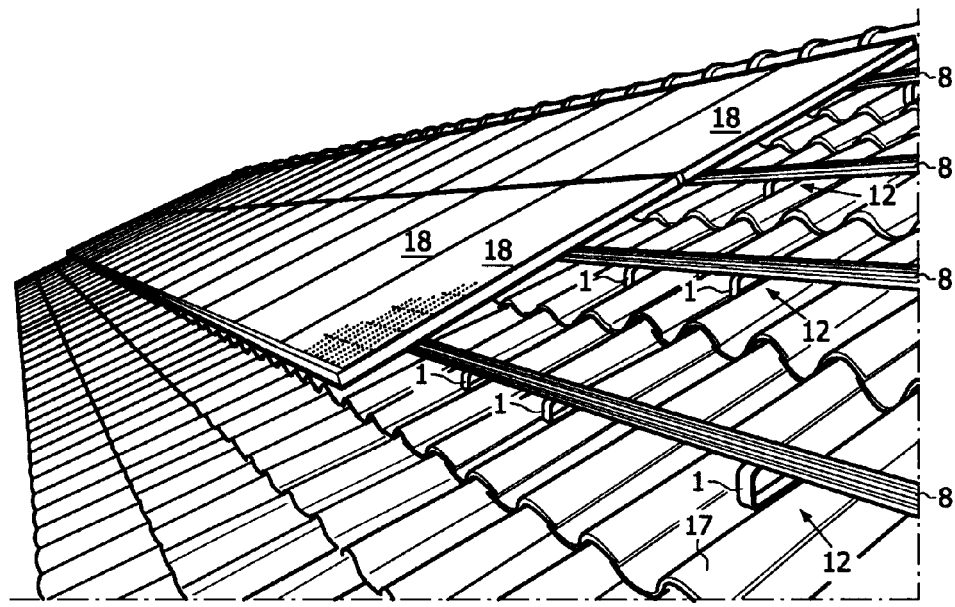
FIG. 4 is a perspective view of a plurality of solar panels arranged on a tiled roof by means of a plurality of the devices of FIG. 2.

FIG. 4 shows a perspective view of a plurality of solar panels 18 arranged on a tiled roof 17 by means of a plurality of the devices 12 of FIG. 2. Mounting rails 8 of devices 12 either lie mutually in line or have a substantially parallel orientation. About four roof hooks 1 will generally be positioned per square meter of roof surface. As shown in FIG. 4, it is possible in this way to fix a plurality of solar panels 18 in a relatively simple and structured manner to a tiled roof 17 which may or may not be pitched. Fixing of device 12 on tiled roof 17 takes place in accordance with the method shown in FIG. 4.

Figure 5:
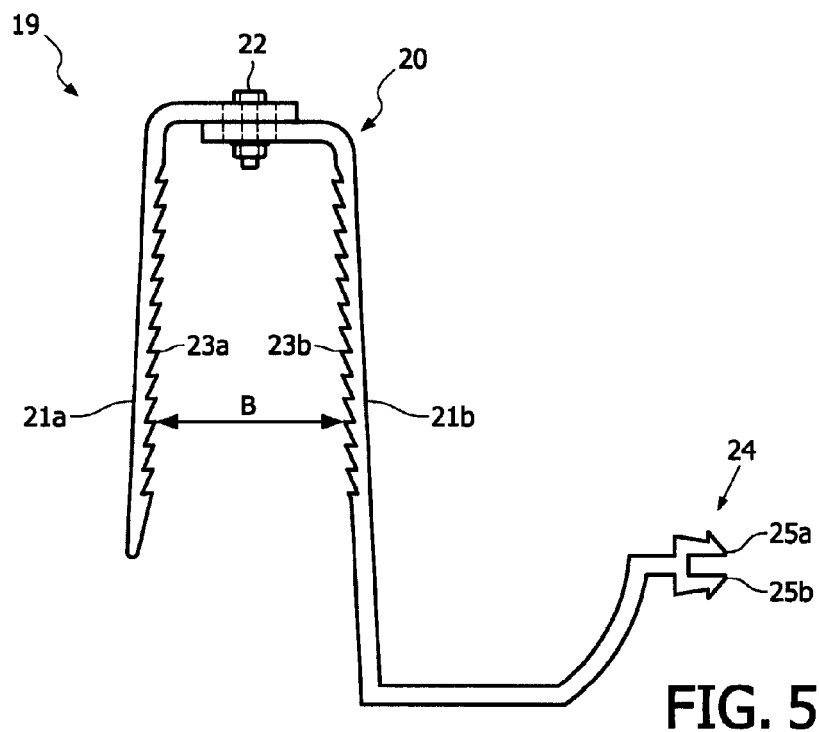
FIG. 5 is a side view of an alternative base element for use in a device according to the present disclosure.

FIG. 5 shows a side view of an alternative exemplary base element 19 for use in a device according to the present disclosure. Base element 19 is formed by a roof hook which is structurally very similar to roof hook 1 shown in FIG. 1a. Base element 19 comprises a hook-shaped member 20, which hook-shaped member 20 comprises two hook parts 21a, 21b which are mutually connected by means of a screw connection 22. It is possible in this manner to be able to adapt the width B between the two hook parts 21a, 21b relatively easily to the width of a tile batten situated therebetween (not shown). So as to be able to optimize the coupling between hook-shaped member 20 and the tile batten, both hook parts 21a, 21b are provided with a sawtooth profile 23a, 23b. An outer end of hook-shaped member 20 remote from the base element is provided with coupling means 24 to enable clicking of base element 19 fixedly to a top structure (not shown). Coupling means 24 are formed by two coupling members 25a, 25b in mirror image design.

The present disclosure is not limited to the exemplary embodiments shown and described here, but that, within the scope of the claims of the present disclosure, numerous variations are possible which will be self-evident to the skilled person in the art.

The invention claimed is:

1. A device for fixing objects, such as solar panels, to a roof, the device comprising:
    a) at least one base element including
        (i) a generally straight first portion having a first end and a second end, the first portion having a plurality of teeth forming a sawtooth profile,
        (ii) a second portion connected to the second end of the first portion,
        (iii) a third portion having a first end connected to the second portion and having a second end including a coupling comprising a coupling finger, a locking element, and a tongue, wherein the finger, locking element and tongue form a first coupling, and wherein the at least one base element is connected to a tile batten of the roof; and
    b) a mounting rail connected to the base element, the mounting rail comprising an elongated rail member having a first space defining a first channel adapted to receive the tongue, a second space defining a second channel adapted to receive the coupling finger, a third space defining a groove adapted to receive the locking element, wherein the groove is provided with an opening in a direction transverse to the roof to secure a locking element in the groove in a direction transverse to the roof and, a fourth space adapted to receive a portion of the object,
    wherein the device is adapted to connect by means of a second coupling to the tile batten on a roof such that the plurality of teeth are configured to grip one edge or side of a tile batten.

2. The device of claim 1, wherein the first portion second end has a slot defined therein and the second portion has a first end having a slot defined therein, the first and second slots having a connector passing therethrough for connecting the first portion and the second portion and adapted to permit slidingly adjustable movement between the first portion and the second portion to permit adjustment of a gap between the first portion and the second portion.

3. The device of claim 1, wherein the device comprises a plurality of base elements, which base elements are adapted for simultaneous co-action with the mounting rail.

4. The device of claim 1, wherein the base element is formed by an extrusion profile.

5. A device for fixing objects, such as solar panels, to a roof, the device comprising:
    a) at least one base element including
        (i) a first portion having a first end and a second end and having a plurality of projections associated therewith, the plurality of projections forming a first coupling comprising a coupling finger, a locking element, and a tongue,
        (ii) a second portion associated with the second end of the first portion, and
        (iii) a third portion having a first end associated with the second portion and having a second end including a second coupling, wherein the at least one base element is connected by means of the second coupling to a tile batten of the roof; and b) a mounting rail comprising a structure separate from the solar panel and connected by the first coupling to the base element, the mounting rail comprising an elongated rail member having a plurality of spaces, each space defined by a channel, at least one channel defining a receiving space for receiving a mechanical fixing means.

6. A device for fixing objects, such as solar panels, to a roof, the device comprising:

a) at least one base element including
   (i) a first portion having a first end and a second end and having a plurality of projections associated therewith, the plurality of projections forming a first coupling,
   (ii) a second portion associated with the second end of the first portion, and
   (iii) a third portion having a first end associated with the second portion and having a second end including a second coupling, wherein the at least one base element is connected by means of the second coupling to a tile batten of the roof; and b) a mounting rail comprising a structure separate from the solar panel and connected by the first coupling to the base element, the mounting rail comprising
   (i) an elongated rail member having a plurality of spaces, each space defined by a channel,
   (ii) at least one channel defining a receiving space for receiving a mechanical fixing means including a tongue, and,
   (iii) a first channel adapted to receive the tongue,
   (iv) a second channel adapted to receive a coupling finger,
   (v) a third space defining a groove adapted to receive a locking element, and
   (vi) a fourth space adapted to receive a portion of the object.

7. A device for fixing objects, such as solar panels, to a roof, the device comprising:

a) at least one base element including
   (i) a first portion having a first end and a second end and having a plurality of projections associated therewith, the plurality of projections forming a first coupling comprising a first member and a second member, each member having a barb, the first coupling is received within a space in the mounting rail,
   (ii) a second portion associated with the second end of the first portion, and
   (iii) a third portion having a first end associated with the second portion and having a second end including a second coupling, wherein the at least one base element is connected by means of the second coupling to a tile batten of the roof; and b) a mounting rail comprising a structure separate from the solar panel and connected by the first coupling to the base element, the mounting rail comprising an elongated rail member having a plurality of spaces, each space defined by a channel, at least one channel defining a receiving space for receiving a mechanical fixing means.

8. A device for fixing objects, such as solar panels, to a roof, the device comprising:

a) a hook comprising:
   (i) a first section including a first portion having a plurality of teeth forming a sawtooth profile, a second portion generally parallel to the first section, and a third portion connecting the first and second portions such that the first section forms a generally U-shaped hook, and
   (ii) a second section connected to the first section, the second section including a coupling mechanism comprising a coupling finger having a notch, a locking element and a tongue, the tongue terminating in a tooth;

b) an elongated mounting rail connectable to the hook and comprising:
   (i) a wall extending generally the length of the rail, the wall having a first side and a second side,
   (ii) a hook attachment section associated with the first side of the wall and adapted to connect to the hook, the hook attachment section including
      (A) a generally C-shaped receiving space defined in the hook attachment section and having a first lip adapted to receive and retain the coupling finger notch,
      (B) a groove for receiving the locking element, and
      (C) the wall second side engages the tongue tooth, and
   (iii) a panel attachment section associated with the second side of the wall and adapted to connect to a panel, the panel attachment section including:
      (A) at least one mounting surface to which the panel can be mounted, and
      (B) a receiving space defined therein,
wherein a panel can be attached to the mounting rail second section by a mechanical fixing means and the hook is adapted to attach to the mounting rail first section by snap fit, and
wherein the device is adapted to connect to tile batten on a roof.

9. The device of claim 8, wherein the coupling mechanism of the hook is adapted to releasably snap connect to the elongated mounting rail.

10. The device of claim 8, wherein a receiving space volume enclosed by the substantially hook-shaped member hook is changeable.

11. A device for fixing objects, such as solar panels, to a roof, the device comprising:

a) at least one base element is connected to a tile batten of the roof, the at least one base element comprising a coupling mechanism comprising a coupling finger having a notch, a locking element and a tongue, the tongue terminating in a tooth; and b) an elongated mounting rail adapted to connect to a hook and comprising
   (i) a wall extending generally over the length of a rail, the wall having a first side and a second side,
   (ii) a hook attachment section associated with the wall and adapted to connect to the hook, the hook attachment section including:
      (A) a generally C-shaped receiving space defined in the hook attachment section associated with the first side of the wall adapted to receive and retain the coupling finger notch, and
      (B) the wall second side engages the tongue tooth, and
   (iii) a panel attachment section adapted to connect to a panel, the panel attachment section including at least one mounting surface to which the panel can be mounted,
wherein a panel is attached to the mounting rail panel attachment section by a mechanical fixing means and the hook is adapted to attach to the mounting rail hook attachment section by snap fit.

12. The device of claim 11, wherein the generally C-shaped receiving space is changeable.

13. A device for fixing objects, such as solar panels, to a roof, the device comprising:
   a) at least one base element connected to the roof by means of a hook, comprising, a coupling mechanism comprising a coupling finger having a notch, a locking element and a tongue, the tongue terminating in a tooth,
   b) an elongated mounting rail connected to the hook and comprising
      (i) a wall extending generally the length of the rail, the wall having a first side and a second side,
      (ii) a hook attachment section adapted to connect to the hook, the hook attachment section including
         (A) a generally C-shaped receiving space defined in the hook attachment section associated with the first side of the wall adapted to receive and retain the coupling finger notch,
         (B) the wall second side engages the tongue tooth and
      (iii) a panel attachment section adapted to connect to a panel, the panel attachment section including at least one mounting surface mounted to the panel,
   wherein a panel attached to the mounting rail panel attachment section by a mechanical fixing means and the hook is adapted to attach to the mounting rail hook attachment section by snap fit.

14. The device of claim 13, wherein the generally C-shaped receiving space is changeable.

15. A device for fixing solar panels to a roof, the device comprising:
   a) at least one aluminum base element having a hook-shaped first base element portion shaped for coupling to a roof batten and a second base element portion comprising means for releasably coupling the aluminum base element to a mounting rail; and
   b) a mounting rail comprising a first mounting rail portion releasably connected to the second base element portion of the base element, wherein the mounting rail includes a first channel shaped receiving space for fixing a solar panel to the mounting rail, and
   wherein the base element means for releasably coupling the base element to the mounting rail comprises a snap connection releasable by deforming a portion of the base element.

16. The device of claim 15, wherein the first mounting rail portion is on one side of the mounting rail and the first channel shaped receiving space means is on an opposite side of the mounting rail.

17. The device of claim 15, wherein the mounting rail is slidably connected to the base element in a direction generally parallel to the roof surface.

18. The device of claim 15, wherein the hook-shaped first base element portion has a profile shape to facilitate insertion between the roof and a roof batten which profile shape resists removal of the hook-shaped first base element portion from between the roof the roof batten.

19. The device of claim 15, wherein the snap connection results from relative movement of the mounting rail and base element in a direction generally perpendicular to the roof surface.

20. The device of claim 15, wherein the base element means for releasably coupling the base element to the mounting rail comprises a finger, a resilient tongue and a locking element intermediate the finger and tongue.

21. The device of claim 20, wherein the mounting rail comprises an elongated rail comprising a first channel shaped for receiving the resilient tongue, a second channel shaped for receiving the finger and a third channel intermediate the first and second channels shaped for receiving the locking element.

22. The device of claim 15, wherein the hook-shaped first base element portion is shaped for coupling to a roof batten by placing the end of the hook-shaped first base element portion between the roof and a roof batten.

* * * * *